(12) United States Patent
Williams

(10) Patent No.: US 9,114,591 B2
(45) Date of Patent: Aug. 25, 2015

(54) EMBEDDED CONDUCTOR HONEYCOMB CORE AND SANDWICH PANEL INCORPORATING SAME

(71) Applicant: BELL HELICOPTER TEXTRON INC., Fort Worth, TX (US)

(72) Inventor: Randy B. Williams, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/724,257

(22) Filed: Dec. 21, 2012

(65) Prior Publication Data

US 2013/0122245 A1 May 16, 2013

Related U.S. Application Data

(63) Continuation of application No. 12/523,585, filed as application No. PCT/US2007/061086 on Jan. 25, 2007, now Pat. No. 8,337,972.

(51) Int. Cl.
| | | |
|---|---|---|
| *B32B 3/12* | (2006.01) | |
| *B29C 70/86* | (2006.01) | |
| *B29C 70/88* | (2006.01) | |
| *B32B 3/28* | (2006.01) | |
| *B32B 5/26* | (2006.01) | |
| *B32B 15/02* | (2006.01) | |

(Continued)

(52) U.S. Cl.
CPC ............... *B32B 3/12* (2013.01); *B29C 70/865* (2013.01); *B29C 70/885* (2013.01); *B32B 3/28* (2013.01); *B32B 5/26* (2013.01); *B32B 15/02* (2013.01); *B32B 15/14* (2013.01); *B64D 43/00* (2013.01); *E04C 2/365* (2013.01); *B32B 2250/40* (2013.01); *Y02T 50/433* (2013.01); *Y10T 29/49826* (2015.01); *Y10T 156/10* (2015.01); *Y10T 428/1234* (2015.01); *Y10T 428/24149* (2015.01); *Y10T 428/24157* (2015.01); *Y10T 428/24165* (2015.01); *Y10T 428/24661* (2015.01)

(58) Field of Classification Search
CPC .......... B29C 70/885; B32B 3/28; B32B 5/26; B32B 2250/42; B32B 2305/024; B32B 2307/262; B32B 2307/412; B32B 2307/414; B32B 2307/724; B32B 2307/726; E04C 2/36; E04C 2/365; B31F 1/28; B31F 1/2813; B21D 47/00; B31D 3/005; B31D 3/02
USPC ........................................... 428/116; 410/154
See application file for complete search history.

(56) References Cited

U.S. PATENT DOCUMENTS 2,997,519 A * 8/1961 Hines et al. ..................... 174/28
3,346,442 A 10/1967 Carmody
(Continued)

OTHER PUBLICATIONS

Canadian Examination Report in related Canadian Application No. 2,676,215 issued by Canadian Intellectual Property Office on Jun. 17, 2011, 2 pages.

(Continued)

*Primary Examiner* — David Sample
*Assistant Examiner* — Nicholas W Jordan
(74) *Attorney, Agent, or Firm* — James E. Walton

(57) ABSTRACT

A honeycomb core includes a first wall secured to a second wall and a conductor disposed therebetween. A honeycomb cell is formed between the first wall and the second wall and the conductor is configured to extend through the cell and a point where the first wall and the second wall are secured together.

13 Claims, 3 Drawing Sheets

(51) Int. Cl.
*B32B 15/14* (2006.01)
*B64D 43/00* (2006.01)
*E04C 2/36* (2006.01)

(56) References Cited

U.S. PATENT DOCUMENTS

| | | | |
|---|---|---|---|
| 3,389,748 A | | 6/1968 | Hitchens |
| 3,523,853 A | * | 8/1970 | Thomas .................. 156/354 |
| 3,640,798 A | * | 2/1972 | Deeds ..................... 428/117 |
| 3,886,558 A | | 5/1975 | Cary et al. |
| 4,149,026 A | * | 4/1979 | Fritz et al. ............ 174/117 FF |
| 4,231,186 A | * | 11/1980 | Ruuska ................... 428/118 |
| 4,564,547 A | | 1/1986 | Hughes |
| 4,685,563 A | * | 8/1987 | Cohen et al. ............ 206/721 |
| 5,662,982 A | * | 9/1997 | Diaz ....................... 428/116 |
| 6,284,331 B1 | | 9/2001 | Nurre |
| 6,998,586 B2 | * | 2/2006 | Kitada .................... 219/530 |
| 7,396,577 B2 | | 7/2008 | Riley et al. |
| 8,337,972 B2 | * | 12/2012 | Williams ................. 428/116 |
| 2002/0102384 A1 | | 8/2002 | Peck et al. |
| 2005/0002197 A1 | | 1/2005 | Kohlmeier-Beckmann et al. |
| 2005/0265038 A1 | | 12/2005 | Muller |

OTHER PUBLICATIONS

PCT Search Report and Written Opinion in Parent PCT Application No. PCT/US07/61086, dated Sep. 25, 2007, 9 pages.
Article 34 Amendments dated Jan. 8, 2009 from counterpart PCT App. No. PCT/US07/61086.
PCT International Preliminary Examination Report in Parent PCT Application No. PCT/US07/61086, dated Nov. 25, 2009, 5 pages.
Supplementary European Search Report in related European Application No. 07717425, dated Sep. 7, 2011, 6 pages.
Chinese Examination Report dated Oct. 26, 2012 from counterpart CN Application No. 2007800504694.
Office Action dated Feb. 2, 2012 from counterpart U.S. Appl. No. 12/523,585.
Amendment dated May 2, 2012 from counterpart U.S. Appl. No. 12/523,585.
Final Office Action dated Jun. 22, 2012 from counterpart U.S. Appl. No. 12/523,585.
Amendment After Final dated Aug. 12, 2012 from counterpart U.S. Appl. No. 12/523,585.
Notice of Allowance dated Aug. 17, 2012 from counterpart U.S. Appl. No. 12/523,585.
Chinese Examination Report dated Apr. 11, 2013 from counterpart CN Application No. 200780050469.4.

* cited by examiner

EMBEDDED CONDUCTOR HONEYCOMB CORE AND SANDWICH PANEL INCORPORATING SAME

BACKGROUND

1. Field of the Invention

The present invention relates to the field of composite structures.

2. Description of Related Art

Many systems require signals or power, such as electrical, optical, or fluid signals or power, to be routed from one point to another point. Electrical signals and power are conventionally transmitted over wires or other such electrical conductors. Optical signals and power are conventionally propagated along optical fibers, optical waveguides, or the like. Fluid signals and power are conventionally transmitted through pipes, tubes, or other conduits. Electrical conductors, optical fibers or waveguides, and fluid conductors are often bundled into cables or "harnesses."

Considerable effort and expense is expended, in many cases, to attach such cables to adjacent structural components. In some systems, such as aircraft or other vehicles, considerable effort and expense is also expended to route the cables or harnesses around structural and other components of the system. Moreover, cables and harnesses can significantly contribute to the overall weight of a system, which is of great importance in aircraft systems.

Some efforts have attempted to address these issues, particularly in the aircraft and other vehicle arts. Vehicles, and aircraft in particular, often include "sandwich" or "solid laminate" panels made from composite materials, such as glass fibers, carbon fibers, aramid fibers, or the like disposed in a polymeric matrix. Sandwich panels typically include a core adhesively bonded between face sheets or "skins." Sandwich panel face sheets and solid laminate panels typically include a plurality of adhesively bonded layers or plies of composite material.

Electrical and optical conductors have been embedded in sandwich panel face sheets or "skins" and in solid laminate panels. A sandwich structure, however, typically has thin face sheets or skins. The thickness of the skins is principally determined by the structural requirements of the sandwich structure. Embedding conductors in the face sheets or skins often increases the thickness of the face sheets or skins to unacceptable levels. For example, thick skins are heavier than thinner skins. Moreover, thick skins may interfere with other structure and systems near the skins.

There are many ways of routing conductors well known in the art; however, considerable room for improvement remains.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
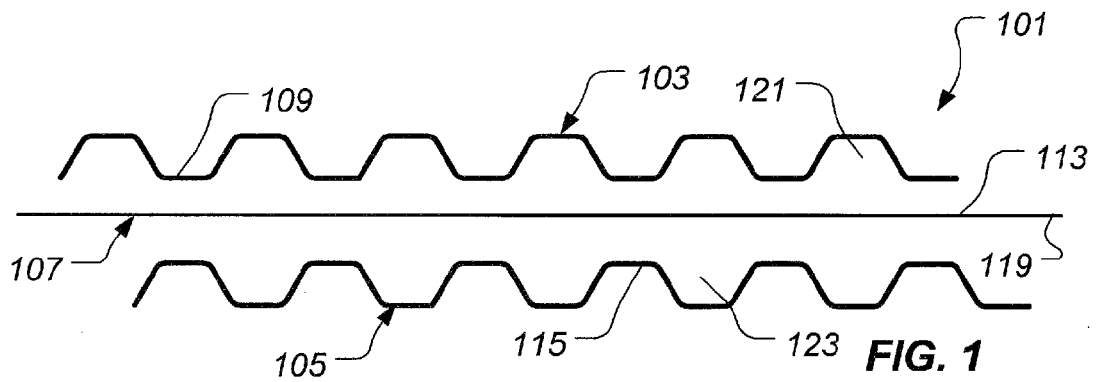
FIG. 1 is a stylized, top, plan, exploded view of an illustrative embodiment of a honeycomb core including an embedded conductor.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention represents a honeycomb core having an embedded conductor, such as an electrical, optical, or fluid conductor. For the purposes of this disclosure, the term "honeycomb core" means a core material comprising a plurality of interconnected cell walls that define a plurality of cells. While many honeycomb core materials define hexagonal cells, the scope of the present invention encompasses core materials that define cells of other shapes, such as square, rectangular, and the like. The honeycomb core of the present invention comprises a first formed wall, a second formed wall, and a conductor disposed between the first formed wall and the second formed wall. The first formed wall is adhesively bonded to a first side of the conductor or to a first side of insulation disposed about the conductor, if such insulation is present. The second formed wall is adhesively bonded to a second side of the conductor or to a second side of the insulation disposed about the conductor, if such insulation is present. The walls define a plurality of cells through which the conductor extends. The conductor extends from edges of the honeycomb core, so that the conductor may be connected to other equipment, devices, systems, and the like.

FIG. 1 is an exploded view of an illustrative embodiment of a honeycomb core 101. As is described herein, honeycomb core 101 may form a portion of a larger honeycomb core. In the illustrated embodiment, honeycomb core 101 comprises a first formed wall 103, a second formed wall 105, and a conductor 107. Formed walls 103 and 105 may comprise paper, unwoven fibers, woven fibers, or any other suitable material for honeycomb core 101. Conductor 107 is disposed between first formed wall 103 and second formed wall 105 and may comprise an electrical conductor, an optical conductor, and/or a fluid conductor. Portions 109 of first formed wall 103 are adhesively bonded to a first side 113 of conductor 107. Portions 115 of second formed wall 105 are adhesively bonded to a second side 119 of conductor 107. It should be noted, however, that the adhesive for bonding walls 103 and 105 to conductor 107 may comprise adhesive coatings, such as coatings generated when walls 103 and 105 are immersed in a resin bath. Moreover, the adhesive may comprise adhesive impregnated about woven or unwoven fibers in walls 103 and 105 made from composite "pre-preg" material.

It should be noted that, in some embodiments, conductor 107 may be formed of a bare electrical conductor or may be formed of an electrical conductor with insulation disposed about the conductor. Thus, while the present disclosure describes first wall 103 and second wall 105 as being adhesively bonded to conductor 107, the scope of the present invention encompasses first wall 103 and second wall 105 being adhesively bonded to insulation disposed about conductor 107. In some embodiments wherein conductor 107 comprises a bare electrical conductor, i.e., without insulation disposed about conductor 107, adhesive used to bond walls 103 and 105 to conductor 107 electrically insulate conductor 107 from walls 103 and 105. It should be noted that walls 103 and 105 may themselves serve as an insulator when walls 103 and 105 are constructed of a low dielectric or insulating material. As is discussed herein, the scope of the present invention encompasses a plurality of conductors, such as conductor 107, disposed between walls 103 and 105.

Figure 2:
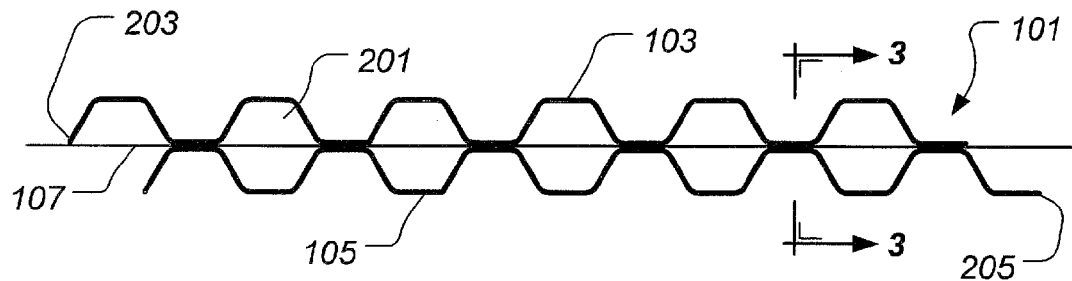
FIG. 2 is a stylized, top, plan view of the honeycomb core of FIG. 1.

Referring now to FIG. 2, walls 103 and 105 form one or more cells 201 (only one indicated in FIG. 2 for clarity) of honeycomb core 101 when walls 103 and 105 are adhesively bonded to conductor 107. In the illustrated embodiment, walls 103 and 105 are formed to define recesses 121 and 123 (only one each indicated in FIG. 1), respectively. When walls 103 and 105 are adhesively bonded to conductor 107, recesses 121 and 123 form cells 201. Conductor 107 extends through cells 201 and extends from a first edge 203 of honeycomb core 101 and a second edge 205 of honeycomb core 101.

Figure 3:
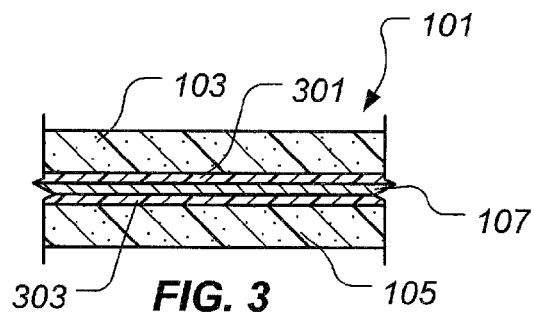
FIGS. 3-7 are cross-sectional views of various alternative constructions of the honeycomb core of FIG. 1.

FIG. 3 depicts a cross-sectional view of one particular embodiment of honeycomb core 101. In the illustrated embodiment, conductor 107 is a bare electrical conductor, which is electrically insulated from walls 103 and 105 by layers 301 and 303 of adhesive. Adhesive layers 301 and 303 bond walls 103 and 105 to conductor 107. In one embodiment, adhesive layers 301 and 303 are provided as separate layers, such as adhesive film, disposed between wall 103 and conductor 107 and between wall 105 and conductor 107, respectively. In another embodiment, adhesive layers 301 and 303 are provided by adhesive disposed on walls 103 and 105, such as from a resin bath. In yet another embodiment, adhesive layers 301 and 303 are provided by adhesive in composite "pre-preg" that makes up walls 103 and 105.

Figure 4:
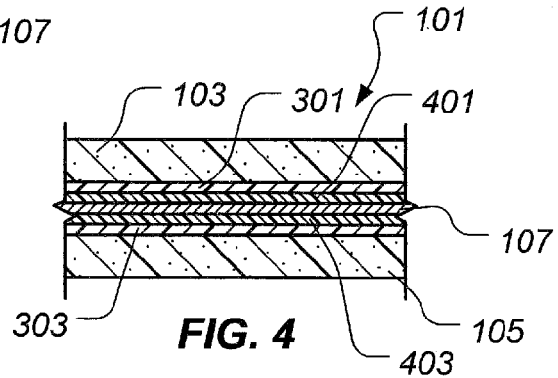

FIG. 4 depicts a cross-sectional view of an embodiment alternative to the embodiment of FIG. 3. In the embodiment of FIG. 4, insulating layers 401 and 403 are disposed between conductor 107 and adhesive layers 301 and 303, respectively. Other aspects of the embodiment of FIG. 4 correspond to the embodiment of FIG. 3. It should be noted, however, that the scope of the present invention encompasses configurations wherein only one of insulating layer 401 and 403 is present.

Figure 5:
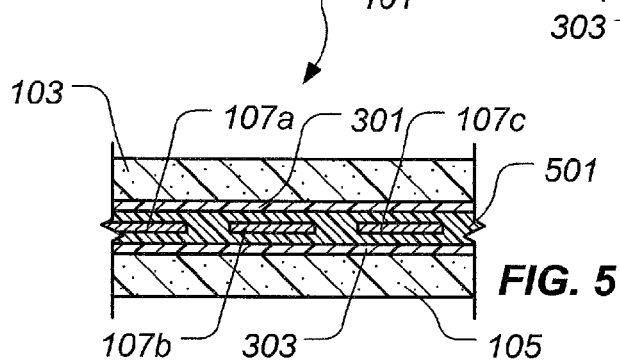

FIG. 5 depicts a cross-sectional view of yet another embodiment alternative to the embodiment of FIG. 3. In the embodiment of FIG. 5, a plurality of conductors 107a-107c are disposed in an insulating layer 501. Adhesive layers 301 and 303 bond walls 103 and 105, respectively, to insulating layer 501. It should be noted that any suitable number of conductors, such as conductors 107a-107c, may be disposed in insulating layer 501. Moreover, while conductors 107a-107c are depicted as being rectangular in cross-section, the scope of the present invention is not so limited. Rather, the conductor or conductors in any of the embodiments disclosed herein may exhibit any suitable shape, such as substantially round. For example, conductors 107a-107c and insulating layer 501 may form a "ribbon cable" that is disposed between and adhesively bonded to walls 103 and 105. In one embodiment, the conductor or conductors of the present invention comprise a metallic foil.

Figure 6:
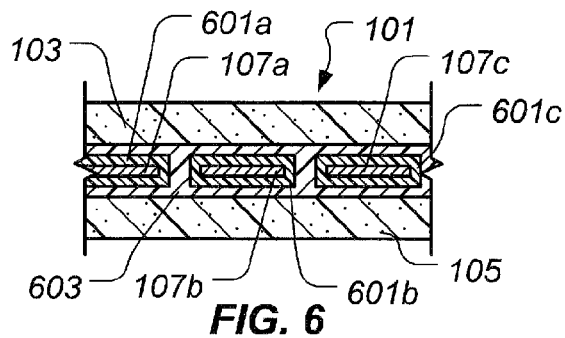

As depicted in FIG. 6, conductors 107a-107c may be disposed in separate insulating layers 601a-601c, respectively. Insulating layers 601a-601c are disposed in an adhesive layer 603, which bonds insulating layers 601a-601c to walls 103 and 105.

Figure 7:
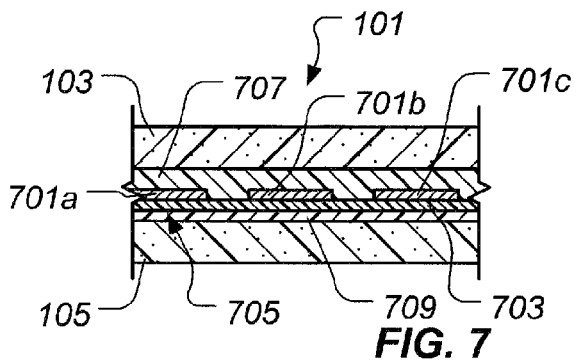

Moreover, as depicted in FIG. 7, honeycomb core 101 may comprise a plurality of conductors 701a-701c disposed on a substrate 703, forming a printed wiring board or element 705. Printed wiring element 705 is disposed between and adhesively bonded to walls 103 and 105 by adhesive layers 707 and 709, respectively. Note that an insulating layer, such as insulating layer 401, may be disposed between conductors 701a-701c and adhesive layer 707.

Figure 8:
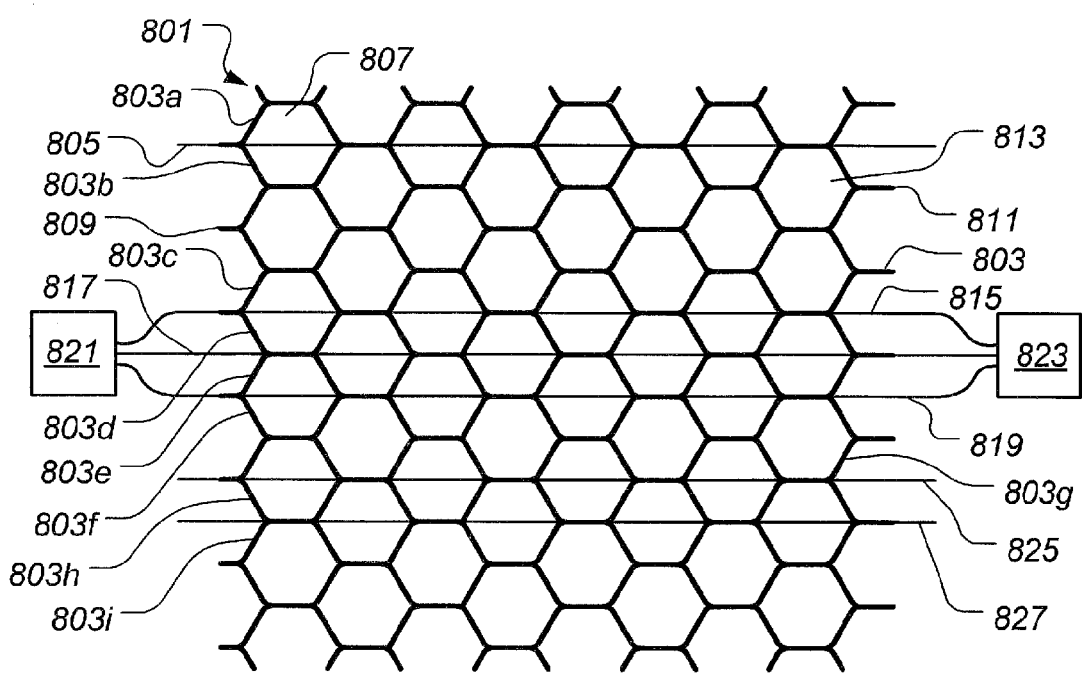
FIG. 8 is a top plan view of an illustrative embodiment of a honeycomb core including a plurality of embedded conductors.

FIG. 8 depicts an illustrative embodiment of a honeycomb core 801. Honeycomb core 801 comprises a plurality of formed walls 803 (only one indicated in FIG. 8 for clarity). Conductors are disposed between at least some of the plurality formed walls 803. In the illustrated embodiment, conductor 805 is disposed between formed walls 803a and 803b in a fashion corresponding to the embodiment of FIGS. 1 and 2. In other words, formed wall 803a corresponds to formed wall 103, formed wall 803b corresponds to formed wall 105, and conductor 805 corresponds to conductor 107. Formed walls 803a and 803b define cells 807 through which conductor 805 extends. Conductor 805 also preferably extends from a first edge 809 and a second edge 811 of honeycomb core 801, so that conductor 805 can be coupled with other equipment, devices, systems, or the like.

In the illustrated embodiment, conductors do not extend through cells 813 of honeycomb core adjacent to cells 807, through which conductor 805 extends. In other embodiments, or within the same honeycomb core, conductors may extend through cells that are adjacent to one another. For example, still referring to FIG. 8, a conductor 815 is disposed between and adhesively bonded to formed walls 803c and 803d, a conductor 817 is disposed between and adhesively bonded to formed walls 803d and 803e, and a conductor 819 is disposed between and adhesively bonded to formed walls 803e and 803f. Thus, one portion of honeycomb core 801 includes conductors, i.e., conductors 815, 817, and 819, that extend through adjacent cells and are disposed between adjacent formed walls, i.e., formed walls 803*c*, 803*d*, 803*e*, and 803*f*. In this particular embodiment, conductors 815, 817, and 819 are terminated at connectors 821 and 823 proximate edges 809 and 811, respectively, of honeycomb core 801, so that conductors 815, 817, and 819 may be coupled with other conductors, devices, systems, and/or equipment, or to adjacent honeycomb core having conductors embedded therein.

Adjacent conductors, however, are not necessarily terminated in common connectors. For example, still referring to FIG. 8, a conductor 825 is disposed between and adhesively bonded to formed walls 803*g* and 803*h*, while a conductor 827 is disposed between and adhesively bonded to formed walls 803*h* and 803*i*.

It should be noted that, while conductors 107, 805, 815, 817, 819, 825, and 827 are depicted in the Figures as extending substantially linearly through honeycomb core 101 or 801, the scope of the present invention is not so limited. Rather, conductors of the present invention may take any suitable route through a honeycomb core, such as a non-linear or circuitous route.

Figure 9:
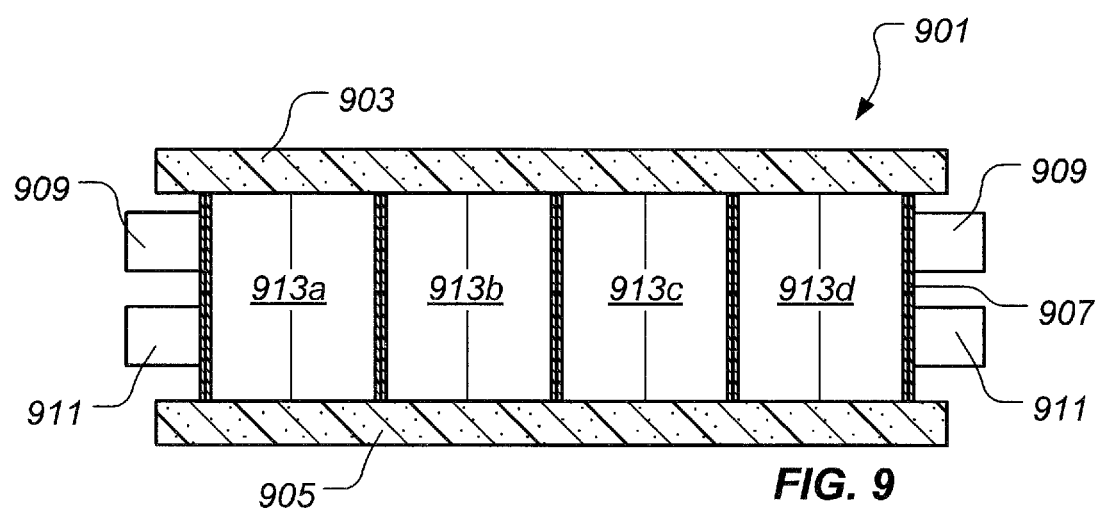
FIG. 9 is a side, elevational, cross-sectional view of a first illustrative embodiment of a sandwich panel incorporating a honeycomb core of the present invention.

FIG. 9 depicts a side, elevational, cross-sectional view of a first illustrative embodiment of a sandwich panel 901. Panel 901 comprises an upper skin 903, a lower skin 905, and a honeycomb core 907 adhesively bonded to upper skin 903 and lower skin 905. Conductors 909 and 911 are embedded in honeycomb core 907, as described herein concerning the embodiments of FIGS. 1-8.

Figure 10:
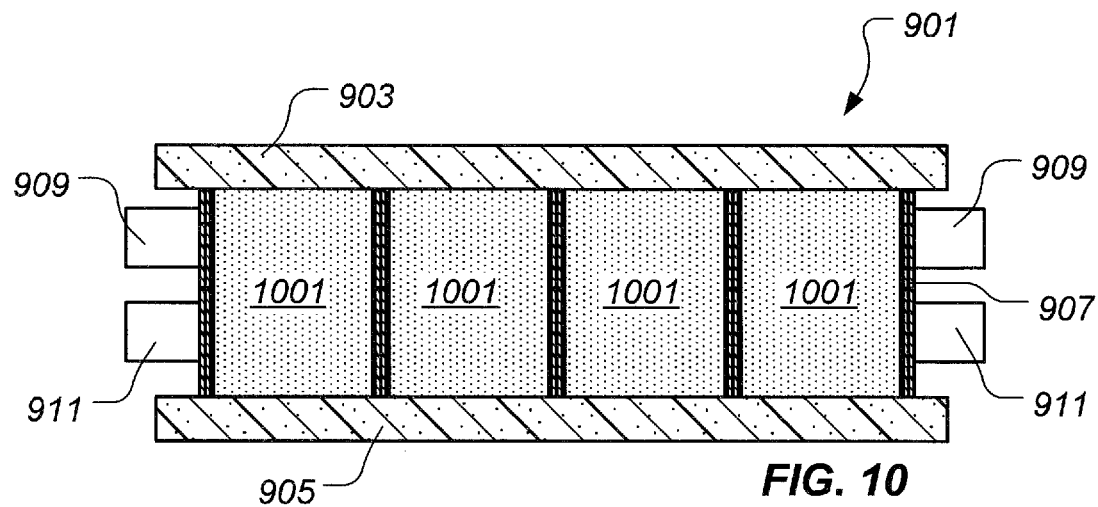
FIG. 10 is a side, elevational, cross-sectional view of a second illustrative embodiment of a sandwich panel incorporating a honeycomb core of the present invention.

As shown in FIG. 10, it should be noted that some or all of the cells of honeycomb core 907, such as cells 913*a*-913*d* (shown in FIG. 9), of honeycomb core 907 may be partially or substantially completely filled with an aerogel 1001, for example, as described in commonly-owned U.S. patent application Ser. No. 10/514,753, published as U.S. Published Patent Application 2005/0208321; and/or Patent Cooperation Treaty Application Serial No. PCT/US2005/013675, published as WO2006/115477, each of which is incorporated herein by reference in its entirety for all purposes. Generally, aerogels are a class of open-celled, mesoporous, solid materials possessing no less than 50% porosity by volume. Typically, aerogels are composed of 90-99.8% air, with densities ranging from 1.9 mg/cm$^3$ to around 150 mg/cm$^3$. At the nanoscale, an aerogel structurally resembles a sponge and is composed of a network of interconnected nanoparticles. Aerogels can be composed of a variety of materials including silica, alumina, zirconia, and the like. Aerogel 1001 improves the thermal insulation properties of panel 901. In some embodiments, aerogel 1001 includes a radar-absorbing material, such as carbon. Aerogel 1001 may take on the form of a single element or may be in granular form.

The present invention provides significant advantages, including: (1) providing a lower-weight means for conducting power or signals; (2) providing a means for conducting power or signals through sandwich panels without embedding conductors in the skins of the sandwich panels; (3) providing functionality, in addition to structural functionality, to honeycomb core sandwich panels; and (4) providing a means for conducting power or signals through a sandwich panel without increasing the overall thickness or volume of the panel.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A honeycomb core, comprising:
 a first wall that forms a first recess and a first portion;
 a second wall that forms a second recess and a second portion, the first recess and second recess forming a cell;
 an adhesive applied to the first portion and the second portion, the first wall and the second wall joining together at the first portion and the second portion via the adhesive;
 a conductor configured to extend through the cell and configured to extend through the first portion and the second portion and secured in a fixed position via the adhesive, the conductor having a height less than the height of the first portion and the second portion; and
 a first and second insulated layers configured to sandwich the conductor therebetween, the first and second insulated layers being bonded to the first and second walls;
 wherein the conductor extends through the first portion, second portion, and the cell.

2. The honeycomb core of claim 1, wherein the conductor is adhesively bonded by a resin.

3. The honeycomb core of claim 1, wherein the conductor is an electrical conductor.

4. The honeycomb core of claim 1, further comprising:
 a second conductor disposed between the first wall and the second wall;
 wherein the second conductor extends through the cell defined by the first wall and the second wall.

5. The honeycomb core of claim 1, further comprising:
 a third wall; and
 a second conductor disposed between the second wall and the third wall;
 wherein the second wall and the third wall define a second cell through which the second conductor extends.

6. The honeycomb core of claim 1, further comprising:
 a third wall;
 a fourth wall; and
 a second conductor disposed between the third wall and the fourth wall;
 wherein the third wall and the fourth wall define a second cell through which the second conductor extends.

7. The honeycomb core of claim 1, wherein the conductor is an optical conductor.

8. The honeycomb core of claim 1, wherein the conductor is a fluid conductor.

9. A sandwich panel, comprising:
 an upper skin;
 a lower skin;
 a honeycomb core adhesively bonded to the upper skin and the lower skin, the honeycomb core, having:
  a first wall that forms a first recess and a first portion;
  a second wall that forms a second recess and a second portion, the first recess and second recess forming a cell;

an adhesive applied to the first portion and the second portion, the first wall and the second wall joining together at the first portion and the second portion via the adhesive;

a conductor configured to extend through the cell and configured to extend through the first portion and the second portion and secured in a fixed position via the adhesive, the conductor having a height less than the height of the first portion and the second portion; and a first and second insulated layers configured to sandwich the conductor therebetween, the first and second insulated layers being bonded to the first and second walls;

wherein the conductor extends through the first portion, second portion, and the cell.

10. The sandwich panel of claim 9, wherein the conductor is an electrical conductor.

11. The sandwich panel of claim 10, further comprising:
a second conductor disposed between the first wall and the second wall;
wherein the second conductor extends through the cell defined by the first wall and the second wall.

12. The sandwich panel of 10, further comprising:
a third wall; and
a second conductor disposed between the second wall and the third wall;
wherein the second wall and the third wall define a second cell through which the second conductor extends.

13. The sandwich panel of claim 10, further comprising:
a third wall;
a fourth wall; and
a second conductor disposed between the third wall and the fourth wall;
wherein the third wall and the fourth wall define a second cell through which the second conductor extends.

* * * * *